United States Patent
Siebert et al.

(10) Patent No.: US 10,385,219 B2
(45) Date of Patent: Aug. 20, 2019

(54) ZIRCONIUM-BASED COATING COMPOSITIONS AND PROCESSES

(75) Inventors: Elizabeth J. Siebert, Birmingham, MI (US); Bruce H. Goodreau, Romeo, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 323 days.

(21) Appl. No.: 14/127,524

(22) PCT Filed: Jun. 22, 2012

(86) PCT No.: PCT/US2012/043743
§ 371 (c)(1),
(2), (4) Date: Mar. 7, 2014

(87) PCT Pub. No.: WO2012/178003
PCT Pub. Date: Dec. 27, 2012

(65) Prior Publication Data
US 2014/0227514 A1  Aug. 14, 2014

Related U.S. Application Data

(60) Provisional application No. 61/500,319, filed on Jun. 23, 2011.

(51) Int. Cl.
| | |
|---|---|
| *C09D 5/28* | (2006.01) |
| *C09D 5/08* | (2006.01) |
| *C01G 25/02* | (2006.01) |
| *C23C 2/04* | (2006.01) |
| *C23C 18/12* | (2006.01) |
| *C23C 22/34* | (2006.01) |
| *C23C 26/00* | (2006.01) |
| *C23C 26/02* | (2006.01) |
| *C23C 28/00* | (2006.01) |
| *C23C 22/73* | (2006.01) |
| *C23C 22/83* | (2006.01) |

(52) U.S. Cl.
CPC ............... *C09D 5/08* (2013.01); *C01G 25/02* (2013.01); *C23C 2/04* (2013.01); *C23C 18/1216* (2013.01); *C23C 18/1241* (2013.01); *C23C 18/1295* (2013.01); *C23C 22/34* (2013.01); *C23C 22/73* (2013.01); *C23C 22/83* (2013.01); *C23C 26/00* (2013.01); *C23C 26/02* (2013.01); *C23C 28/00* (2013.01); *Y10T 428/273* (2015.01)

(58) Field of Classification Search
CPC ....... C01G 25/02; C23C 2/04; C23C 18/1216; C23C 18/1241; C23C 18/1295; C23C 22/34; C23C 22/83; C23C 26/02; C23C 28/00; C23C 22/73; C23C 26/00; C09D 5/084; C09D 183/04; Y10T 428/273; Y10T 428/265; Y10T 428/31678; Y10T 428/31663; Y10T 428/31529; Y10T 428/12757; C23G 1/10
See application file for complete search history.

(56) References Cited

U.S. PATENT DOCUMENTS

| | | | |
|---|---|---|---|
| 4,171,964 A | 10/1979 | Campbell et al. | |
| 4,370,177 A | 1/1983 | Frelin et al. | |
| 5,603,754 A | 2/1997 | Aoki et al. | |
| 5,653,823 A * | 8/1997 | McMillen | C23C 22/83 148/247 |
| 5,668,096 A | 9/1997 | Rodzewich et al. | |
| 6,059,896 A | 5/2000 | Ehara et al. | |
| 6,060,122 A | 5/2000 | Rossmaier | |
| 6,712,880 B2 | 3/2004 | Foglietta et al. | |
| 8,535,456 B2 | 9/2013 | Ishii et al. | |
| 9,879,346 B2 | 1/2018 | Kodama et al. | |
| 2002/0037821 A1 * | 3/2002 | Renfrow | C11D 1/94 510/218 |
| 2003/0176305 A1 * | 9/2003 | Hoyt | C11D 3/044 510/245 |
| 2003/0199410 A1 * | 10/2003 | Besse | C11D 1/835 510/189 |
| 2004/0187967 A1 * | 9/2004 | Matsukawa | C23C 22/34 148/247 |
| 2006/0089281 A1 * | 4/2006 | Gibson | C09D 9/005 510/201 |
| 2006/0261311 A1 | 11/2006 | Poulet et al. | |
| 2007/0099022 A1 * | 5/2007 | Matzdorf | C23C 22/34 428/653 |
| 2007/0187001 A1 | 8/2007 | Kramer et al. | |
| 2009/0233830 A1 * | 9/2009 | Dirr | C11D 1/721 510/224 |
| 2011/0262803 A1 | 10/2011 | Huang et al. | |

FOREIGN PATENT DOCUMENTS

| | | |
|---|---|---|
| CN | 101384751 A | 3/2009 |
| GB | 2241963 A | 9/1991 |
| JP | 03-215377 A | 9/1991 |
| JP | 2003313499 A | 11/2003 |
| JP | 2004218071 A | 8/2004 |
| JP | 2005264230 A | 9/2005 |
| JP | 2006161117 A | 6/2006 |
| JP | 2010163640 A | 7/2010 |
| JP | 2010192458 A | 9/2010 |
| WO | 9502660 A1 | 1/1995 |

(Continued)

OTHER PUBLICATIONS

"Effects of protonation on the thermodynamic properties of alkyl dimethylamine oxides", by Hiroshi Maeda, et al, Department of Chemistry, Faculty of Science, Kyushu University, Fukuoka 812-8581, Japan. Published in Advances in Colloid and Interface Science 88 (2000), pp. 275-293. Copyright 2000 Elsevier Science B.V.

(Continued)

*Primary Examiner* — Xiuyu Tai
(74) *Attorney, Agent, or Firm* — Mary K. Cameron

(57) ABSTRACT

Compositions and methods for depositing improved zirconium oxide conversion coatings, as well as compositions capable of depositing an adherent zirconium oxide conversion coating on a substrate in the absence of prior cleaning are provided.

32 Claims, No Drawings

(56) References Cited

FOREIGN PATENT DOCUMENTS

| | | |
|---|---|---|
| WO | 0022188 A1 | 4/2000 |
| WO | 2010004651 A1 | 12/2011 |
| WO | 2011002040 A1 | 12/2012 |

OTHER PUBLICATIONS

"Monolayers of Chiral Imidazole Amphiphiles: Domain Formation and Metal Complexation", by J. H. van Esch, et al, Department of Organic Chemistry, Nijmegen SON Research Center, Toernooiveld, 6525 ED Nijmegen, The Netherlands, and Institut fur Organische Chemie, J. J. Becherweg 18-20, Johannes Gutenberg Universitut, 55099 Mainz, Germany. Published in Langmuir 1994, 10, pp. 1955-1961. Copyright 1994 American Chemical Society.
International Search Report for PCT/US2012/043743, dated Mar. 21, 2013, 4 pages.
Supplementary European Search Report, EP Application 12802663.0, dated Jan. 22, 2015. All references cited in the Supplementary European Search Report are listed herein, unless previously cited.

\* cited by examiner

ZIRCONIUM-BASED COATING COMPOSITIONS AND PROCESSES

CROSS-REFERENCE TO RELATED APPLICATIONS

NONE

FIELD OF THE INVENTION

This invention relates to compositions and methods for depositing improved zirconium oxide conversion coatings, as well as compositions capable of depositing an adherent zirconium oxide conversion coating on a substrate in the absence of prior cleaning. More particularly, the invention relates to a coating process and bath compositions used therein which provide a faster deposition rate of zirconium oxide coating on metal substrates than similar coating bath compositions in the absence of the surfactant combination and/or thicker zirconia based coatings having good adherence, some with a unique coating morphology. The invention also provides storage stable, concentrate compositions for use in the bath, methods of making and using the concentrate and bath, as well as metal articles comprising a coating according to the invention.

BACKGROUND OF THE INVENTION

There are currently in the market a number of zirconium oxide depositing conversion coating products useful as coatings in, for example automotive and appliance assembly lines. One use is to replace zinc phosphate products, which are coining under increasing environmental regulation. These zirconia depositing products are used to coat ferrous metal surfaces as well as aluminum and zinc containing surfaces.

Typical zirconium oxide conversion coatings deposited on metal substrates result in a zirconium deposition of 1 to 50 mg $Zr/m^2$, with commercial benchmarks being in the range of 20 to 45 mg $Zr/m^2$. This is a low coating weight as compared to zinc phosphate conversion coating which is understood in the art to generally provide coating weights in the range of 2 to 5 grams/$m^2$ measured as total coating weight, which is generally considered to be roughly half phosphorus and oxygen, the remainder being zinc and various optional transition metals depending on the zinc phosphating product, thus providing a coating weight of about 1000-2500 mg/$m^2$ measured as Zn. One drawback of zirconium oxide coatings at zirconium deposition of 1 to 50 mg/$m^2$ is that they do not provide as good corrosion protection as conventional zinc phosphate processes under some circumstances. Thus there is a need for compositions and processes of coating substrates with a thicker layer of zirconium oxide conversion coating that provides improved corrosion performance Another prospective use for zirconium oxide depositing conversion coating products is as replacements for iron phosphate depositing "cleaner/coater" products. These known phosphate-based cleaning products etch ferrous metal surfaces and produce an iron phosphate coating in addition to cleaning contaminants from surfaces. Generally "cleaner/coater" products provide a coating only on the ferrous metal surfaces and clean but do not coat non-ferrous surfaces, such as surfaces of zinc, zinc alloy, aluminum and aluminum alloy. Also, to produce these iron phosphate coatings, the "cleaner/coater" must include a source of phosphate, which is considered a drawback due to environmental concerns regarding phosphate discharge which is regulated and requires more costly waste treatment processes. Thus there is a need for replacement of iron phosphate cleaner/coaters (clean and pretreat the substrate from the same bath) with more environmentally-friendly, low phosphate or phosphate-free, low temperature, cleaner/coaters. There is also a need for a composition that can provide a conversion coating and cleaning of multi-metal substrates, such as ferrous metal and one or more of zinc, zinc alloy, aluminum and aluminum alloy.

Attempts have been made in the past to prepare compositions that clean a substrate and deposit zirconium oxide containing conversion coatings from the same bath but Applicants have found that many surfactants added to commercially available zirconium oxide depositing pretreatment compositions resulted in unfavorable lowering of coating weights and/or poor corrosion performance of coated substrates, as compared to the surfactant free commercial bath.

Some surfactants added to commercially available zirconiumn oxide depositing pretreatment concentrate and/or bath compositions resulted in instability of the compositions including precipitation of solids and/or separation into two or more liquid phases.

The instant invention solves one or more of the above problems in zirconium oxide coating compositions and processes by including in the pretreatment bath a combination of surfactants that allows depositing an adherent zirconium oxide conversion coating on a substrate in the absence of prior cleaning of the substrate and/or deposits a zirconium oxide conversion coating on multi-metal substrates at a higher coating weight for a selected contact time, as compared to a substrate conventionally cleaned in a separate step and contacted with a conventional zirconium oxide producing coating bath for the same contact time.

SUMMARY OF THE INVENTION

The invention provides zirconium oxide depositing conversion coating compositions and processes comprising a combination of surfactants that allows depositing an adherent zirconium oxide conversion coating on a substrate in the absence of prior cleaning of the substrate and/or deposits a zirconium oxide conversion coating on metal substrates at a higher coating weight/contact time as compared to a substrate conventionally cleaned in a separate step and contacted with a conventional zirconium oxide producing coating bath. Compositions of the invention also coat non-ferrous metals including zinc, zinc alloys, aluminum and aluminium alloys, which was not possible with typical iron phosphating cleaner/coaters.

One aspect of the invention comprises an aqueous composition, which comprises, consists essentially of, or consists of;

A) a source of dissolved zirconium;

B) a source of a first surfactant that is cationic at a selected pH range, typically the pH range of a working bath formed by the aqueous composition, either as-such or as a concentrate diluted to working bath concentration;

C) a source of at least one non-ionic surfactant; different from B).

The composition may, further comprising at least one of:

D) fluoride anions;

E) a pH adjuster in an amount sufficient to provide a pH of no more than 6.75; and F) a fluoride scavenger.

In one embodiment, Component B the source of the first surfactant comprises a surfactant comprising nitrogen and optionally, one or more of O and $SO_3$.

In one embodiment, Component B, comprises a surfactant having an amine moiety, a surfactant having an amine oxide moiety or a combination of these surfactants.

In one embodiment, 25 up to 100% of the first surfactant is protonated at the selected acidic pH.

In one embodiment, Component B, comprises at least one first surfactant selected from alkoxylated alkyl amines having branched or unbranched, cyclic or acyclic alkyl groups of 1 to 20 carbon atoms; alkyl amine oxides; and sultaines.

In one embodiment, component C) comprises at least one non-ionic surfactant; different from B) selected from $C_{6-20}$ alkyl polyglycol ethers, fatty amine ethoxylates; alkyl $C_{6-20}$ alkoxylated benzene-based ethers; ethoxylated $C_{6-20}$ alcohols; EO/PO block copolymers; and alkoxylated terpenes.

Also provided are processes for increasing deposition rate of a zirconium oxide depositing conversion coating bath, comprising including in said zirconium oxide depositing conversion coating bath the composition as described herein.

In another embodiment, a method is provided comprising the steps of:
1) providing a metal substrate having metal surfaces selected from ferrous metal, zinc, zinc alloy, aluminum, aluminum alloy and combinations thereof;
2) contacting said surface with a composition comprising:
    a) a zirconium-based metal pretreatment coating composition comprising 50 to 1000 ppm of dissolved Zr, 0 to 50 ppm of dissolved Cu, 0 to 100 ppm of $SiO_2$, 50 to 2000 ppm of total fluoride, 10 to 120 ppm of free fluoride; and
    b) a surfactant combination comprising:
        a source of a first surfactant that is cationic at a selected pH range, typically the pH range of a working bath formed by the aqueous composition, either as-such or as a concentrate diluted to working bath concentration;
        a source of at least one non-ionic surfactant; different from the first surfactant; and
    c) optionally a chelating agent and/or other additives;
for a time sufficient to form a zirconium oxide containing pretreatment coating having a selected thickness on the metal substrate; and
3) optionally applying a paint to the metal pretreatment coated metal substrate; wherein the time of step 2) is less than a time required to form another zirconium oxide containing pretreatment coating having the selected thickness on the metal substrate by contact with a.) in the absence of: b) and, if present, c).

In some embodiments, step 2) follows step 1) without an intermediate cleaning step.

Another aspect of the invention is a metal article comprising a metal substrate coated according to the methods described herein. Another embodiment comprises a metal article comprising a zirconium oxide containing conversion coating deposited thereon wherein said coating is present in an add-on weight measured as zirconium in a range of 100 to 250 mg/m$^2$ on ferrous substrates.

In one embodiment, surfactant-containing fluorozirconic acid formulations comprise a cationic and/or amphoteric surfactant with a nonionic surfactant which provided stable, one-package concentrates. In one aspect an aqueous concentrate composition, comprises:
a) 0.5 to 20 wt % of a source of dissolved zirconium, said source comprising fluorozirconic acid;
b) 1.5 to 50 wt % a source of a first surfactant that is cationic at a selected pH range, typically the pH range of a working bath formed by the aqueous composition, either as-such or as a concentrate diluted to working bath concentration;
c) 0.5 to 20 wt % of a source of at least one non-ionic surfactant; different from b);
wherein said concentrate is storage stable at ambient temperature for a minimum of 3 months.

Uses of the compositions include uses as cleaner/coater compositions and as zirconium oxide depositing conversion coating compositions. These are useful in coating vehicles, appliances and other metals in need of corrosion protection and/or improved paint adhesion. Contacting may be by spraying, immersion, spray wand or other known application methods. A typical process for producing a finished zirconium oxide coated metal substrate has the following steps in order: application of a cleaner solution; rinse in warm water; application of an anti-corrosion zirconium containing conversion coating; deionized water rinse; air drying, optionally with compressed air, of the substrate; application of one or more of: an initial layer by electrodeposition generally with baking; a primer layer; a basecoat layer; and a clearcoat layer. In the instant invention, the process may be changed at least by replacing the cleaner/rinse/conversion coating steps by at least one contacting step with a cleaner/coater solution according to the invention, optionally with a pre-clean step.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Numerical ranges provided throughout the description and claims are meant to include all subset ranges, that is, it is intended that the range comprises all sub ranges found within the stated range, for example $C_{1-10}$ also discloses $C_{2-10}$, $C_{1-9}$ and $C_{3-7}$. Also, throughout this description, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); the term "paint" and all of its grammatical variations are intended to include any similar more specialized terms, such as "lacquer", "varnish", "electrophoretic paint", "top coat", "clear coat", "color coat", "radiation curable coating", or the like and their grammatical variations; and the term "mole" means "gram mole", and "mole" and its grammatical variations may be applied to elemental, ionic, and any other chemical species defined by number and type of atoms present, as well as to compounds with well defined molecules.

DETAILED DESCRIPTION OF EMBODIMENTS OF THE INVENTION

The invention involves surfactant-containing, acidic aqueous zirconium compositions useful in generating zirconium oxide containing coatings, said compositions providing surprisingly increased deposition rates as compared to similar formulations in the absence of surfactant. These compositions are useful in providing at least one of cleaning and coating in a single bath, depositing an adherent zirconium oxide conversion coating on a substrate in the absence of prior cleaning, better coverage of the substrate, improved corrosion resistance, and different coating morphologies.

Aqueous compositions according to the invention comprise at least water and:
  a) a source of dissolved zirconium;
  b) a source of a first surfactant that is cationic at a selected pH range, typically the pH range of a working bath formed by the aqueous composition, either as-such or as a concentrate diluted to working bath concentration;
  c) a source of at least one non-ionic surfactant; different from b).

To keep dissolved zirconium in solution, in the absence of agents that may couple zirconium ion, the pH desirably may range from 1.0 to 6.75. Neutral or alkaline pH may be acceptable provided that zirconium does not precipitate to an extent that unacceptable sludge production occurs. Desirably, compositions of the invention are acidic and may have a pH of at least in increasing order of preference 1, 2.0, 3.0, 3.5, 4.0, or 4.2 and at most in increasing order of preference 6.75, 6.5, 6.0, 5.5, 5.0, or 4.5. In some embodiments, this pH is obtained by presence in the bath of $H_2ZrF_6$, however, in compositions employing other sources of zirconium, a mineral or organic acid may be used to adjust pH, provided that it does not interfere with the objects or benefits of the invention.

In one embodiment, compositions according to the invention are made up of water and components:
  a) dissolved zirconium ions, preferably $ZrF_6^{-2}$ ions;
  b) a first surfactant that is cationic or is protonated at a selected pH, preferably the pH of a coating composition concentrate or working bath;
  c) a source of at least one non-ionic surfactant, different from b), and uniformly dispersed in the composition;
  d) fluoride anions; optionally:
  e) a pH adjuster in an amount sufficient to provide a pH of no more than 6.75; and
  f) a fluoride scavenger, such as for example aluminum nitrate or the like.

Desirably the source of zirconium and fluoride components may be the same, e.g. $H_2ZrF_6$.

Component A of dissolved zirconium can be derived from any zirconium source provided that the Zr source has adequate solubility and any corresponding anion does not interfere with the stability or functioning of the coating composition. Suitable sources of Zr ions include $H_2ZrF_6$; soluble salts of $H_2ZrF_6$, such as $Na_2ZrF_6$, $K_2ZrF_6$, $Zr(NH_4)_2F_6$; zirconium metal, $Zr(OH)_4$, nitrate and sulfate salts of zirconium, zirconium basic carbonate and the like, provided that the source is adequately soluble in the acidic solution or a concentrate thereof. In a preferred embodiment, the Zr source comprises $H_2ZrF_6$. Amounts of Component A in a working bath may range from about 1 ppm up to the solubility limit of the zirconium in the bath. Generally the working bath comprises at least in increasing order of preference about 1, 2, 3, 4, 5, 6, 7, 8, 9, 10, 15, 25, 50, 75, 100, 125, 150 ppm and not more, at least for economy, than about 1000, 900, 800, 700, 600, 500, 400, 300, 200 ppm.

Component B a source of a first surfactant that is cationic at a selected pH range, may be chosen based on the pH range at which the coating composition will be used, such that the first surfactant is cationic within the pH range of a working bath of the coating composition. Generally, surfactants that are cationic and/or amphoteric at neutral pH are suitable for use in the invention, where the use pH is acidic. In some embodiments, the first surfactant may comprise surfactants that at neutral pH would be considered nonionic surfactants, provided that the nonionic surfactant is cationic or protonated at the selected pH range at which the coating composition is used. The pH at which a nonionic or amphoteric surfactant is protonated and becomes cationic can be readily determined by titration with dilute acid; such titration methods are known in the art. Regardless of the source, the first surfactant is desirably sufficiently stable at acidic pH such that it does not split into multiple liquid layers, coagulate or precipitate in the working bath.

Applicant found that in an acidic solution, generally solutions of pH less than 6.5, 6.0, 5.5, 5.0, 4.5, 4.0, 3.5, 3.0, 2.5, 2.0, 1.75, 1.5, 1.0, amphoteric surfactants having a pK that results in protonation of some or all of the amphoteric surfactant at the selected acidic pH, as well as cationic surfactants, are readily soluble or homogeneously dispersable in the acidic solution, and may be useful in uniformly dispersing a non-ionic surfactant in the acidic solution. Desirably, the amount of amphoteric surfactant that is protonated at the selected acidic pH may be up to 100%, and is generally at least in increasing order of preference 25, 40, 50, 60, 70, 75, 80, 85, 90 or 95%. Nonionic surfactants capable of being protonated such that they become cationic may also be used as Component B provided that the nonionic surfactant can be dispersed in the acidic solution and is useful in dispersing Component C.

In a one embodiment, Component B the source of the first surfactant may be a surfactant comprising nitrogen and optionally, one or more of O add $SO_3$, preferably an oxygen atom bonded to the nitrogen atom. Desirably, the nitrogen containing surfactant comprises an amine moiety, an amine oxide moiety or both.

In one embodiment, Component B is a nitrogen containing surfactant comprising at least one nitrogen atom that is not a member of an unsaturated, heterocyclic ring structure. In this embodiment, it is preferred that none of the nitrogen atoms is a member of an unsaturated heterocyclic ring structure, in particular a non-aromatic, unsaturated, heterocyclic ring structure.

The nitrogen atom in the amine moiety may be a primary, secondary, tertiary or quaternary amine. The nitrogen atom in the amine oxide moiety may have one, two or three substituents in addition to the oxygen atom. Generally, one or more of the substituents provides the hydrophobic aspect of the surfactant, and can be, for example an aliphatic or alkoxylated carbon chain.

In one embodiment, suitable sources of the first surfactant include amine and amine oxide surfactants according to general formula I:

where R₁ is saturated or unsaturated, branched or unbranched, cyclic or acyclic, alkyl, hydroxyalkyl, ether or hydroxyether moiety having 1 to 20 carbon atoms; $R_2$ and $R_3$ independently can be H, alkyl or aryl moieties and X can be O, H, alkyl or aryl moiety. In one embodiment, $R_1$ and X are as described above, and $R_2$ and $R_3$ may be $(CH_2CH_2O)_mH$, $(CH_2CH_2CH_2O)_nH$ and combinations thereof, where m=1-20 and n=0-10. In another embodiment, X is as described above, $R_1$ may be $CH_3(CH_2)_n$, where n is 6 to 20 and each of $R_2$ and $R_3$ can independently be H, methyl, ethyl, propyl or butyl group; wherein "N" has a positive charge and one of substituents $R_1$, $R_2$, $R_3$ and X has a negative charge.

Examples of suitable amine oxide surfactants include: secondary, tertiary and quaternary amine oxides, such as by way of non-limiting example, alkyl amine oxides, including dodecyl dimethyl amine oxide, dodecyl methyl amine oxide, dodecyl amine oxide, decyl dimethyl amine oxide, decyl methyl amine oxide, decyl amine oxide, octyl dimethyl amine oxide, octyl methyl amine oxide, octyl amine oxide, heptyl dimethyl amine oxide and the like.

Examples of suitable amine surfactants include: alkoxylated alkyl amines, having branched or unbranched, cyclic or acyclic alkyl groups of 1 to 20 carbon atoms, such as polyoxyethylene polyoxypropylene tert-$C_{12-14}$-alkyl amine, ethoxylated coco amines, ethoxylated oleyl amines, coco alkyl alkoxylated amines, lauryl alkyl alkoxylated amines, dodecyl alkyl alkoxylated amines, for example ethoxylated coco alkyl amines having 5-20 moles of ethoxylation. Other amine surfactants include sultaines, such as hydroxypropyl alkylether sultaines and lauramidopropyl hydroxysultaine, cocamidopropyl hydroxysultaine, oleamidopropyl hydroxysultaine, tallowamidopropyl hydroxysultaine, erucamidopropyl hydroxysultaine, lauryl hydroxysultaine.

Component C of a non-ionic surfactant may be a nonionic surfactant that is soluble or insoluble in acidic solutions of zirconium or $H_2ZrF_6$. Component C is uniformly dispersed in the composition. As a practical matter, the non-ionic surfactant is often insoluble in such solutions and Component C is uniformly dispersed in the presence of Component B. In some embodiments, the non-ionic surfactant is uniformly dispersed in the composition as micelles of non-ionic surfactant surrounded by or stabilized in the composition by the surfactants of Component B.

Without being bound by a single theory, the first surfactants are thought to "couple" nonionic surfactants into the aqueous composition which aids in maintaining a homogeneous dispersion. That is, in an acidic solution such as acidic zirconium containing conversion coating baths, most non-ionic surfactants are difficult or impossible to uniformly and consistently disperse. Even when dispersed by mixing, the dispersion is not stable and the non-ionic surfactants tend to separate from the acidic solution, which is generally evidenced by the dispersion becoming cloudy or by phase separation into layers. Either result is undesirable. In some embodiments, nonionic surfactants that are insoluble or only slightly soluble in the concentrate or working bath compositions according to the invention are thought to be coupled into a positively-charged micelle by Component A.

Any nonionic surfactant capable of being uniformly dispersed in the composition and providing the benefits of the invention can be used. The nonionic surfactant may be saturated or unsaturated; branched or unbranched; acyclic, cyclic, or aromatic; alkyl, hydroxyalkyl, ether or hydroxyether. Examples of suitable nonionic surfactants for use as Component C include $C_{6-20}$ alkyl polyglycol ethers, fatty amine ethoxylates; alkyl $C_{6-20}$ alkoxylated benzene-based ethers; modified and unmodified ethoxylated $C_{6-20}$ alcohols, for example coconut alcohol ethoxylate; EO/PO block copolymers; alkoxylated terpenes, such as terpenes that comprise random, block or homopolymer ethoxylaation and/or propoxylation; as well as nonionic surfactants of the general formula (II):

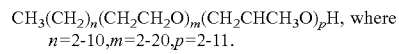
$CH_3(CH_2)_n(CH_2CH_2O)_m(CH_2CHCH_3O)_pH$, where
n=2-10, m=2-20, p=2-11.

Preferable nonionic surfactants have a low cloud point that allows cleaning to occur at low temperatures. For spray applications, the cationic surfactant or amphoteric surfactant and nonionic surfactant combination may be low-foaming.

Amounts of Component B in a working bath is the amount sufficient to produce a uniform dispersion of Component C in the working bath. Typically, for economy's sake the minimum amounts of Component B and C necessary to obtain improvements in deposition rate and/or coating weight per unit contact time and adequate corrosion performance will be used. This amount may be as low as about 1 ppm or much higher when taking into account the percent active or active solids in the surfactants. Generally, the working bath comprises Component B at least in increasing order of preference about 1, 2, 3, 4, 5, 6, 7, 8, 9, 10, 15, 25, 50, 75, 100, 125, 150, 200, 300, 400, 500, 600, 700, 750 ppm and not more, at least for economy, than about 5000, 4000, 3000, 2000, 1000, 900 ppm. Component C may be used in the same amounts as recited above for Component B, although the relative amounts of Component B and Component C in the working bath may the same or different. In one embodiment, Component C is present at least in increasing order of preference in amounts of about 1, 2, 3, 4, 5, 6, 7, 8, 9, 10, 15, 25, 50, 75, 100, 125, 150, 175, 200, 225, 250, 275, 300 ppm and not more, at least for economy, than about 1000, 900, 800, 700, 600, 500, 400 ppm.

Component D) fluoride ions can be obtained from any fluoride source provided that the fluoride source has adequate solubility and any counter ion does not interfere with the stability or functioning of the coating composition. Suitable sources of fluoride ions include HF; $H_2ZrF_6$; soluble salts of $H_2ZrF_6$, such as $K_2ZrF_6$, $Zr(NH_4)_2F_6$; and the like, provided that the source is adequately soluble in the solution or a concentrate thereof. In a preferred embodiment, the fluoride source is HF or $H_2ZrF_6$. Fluoride concentration may range from −50 to 2000 ppm.

The aqueous composition may contain component E) a pH adjuster if necessary. The pH adjuster is added in an amount sufficient to provide a pH of no more than 6.75 and no less than about 1. The choice of the acid or base for adjusting pH is not critical. Any mineral or organic acids and bases known in the art can be used provided that they do not interfere with the stability or functioning of the coating composition. HF, nitric acid, phosphoric acid, ammonium bicarbonate and/or ammonium hydroxide may be used.

The aqueous composition desirably contains component F) a fluoride scavenger, which can be any substance capable of complexing free fluoride ions provided component F) does not interfere with the stability or functioning of the coating composition. Suitable sources of component F) include a complex-forming metal or metalloid compound, which is different from Component A, soluble in the composition, such as for example soluble compounds of Groups 2-7, e.g. salts of alkaline earth metals, salts of transition metals, such as nitrates and sulfates of Sc, Y, La, Ti, Zr, Mn, tetrafluorotitanate and tetrafluorozirconate; and soluble compounds metalloid elements; which form stable fluoride complexes. Some suitable examples include aluminum nitrate, aluminum silicates, sodium metasilicate, polysilicate or the like.

Other additives may be present to improve performance or working bath stability including chelating agents, mineral acid, such as phosphoric acid or nitric acid; cerium, hafnium, zinc, polymers, chelators, flash rust inhibitors, and the like. In some embodiments, colloidal particles may be used, in particular particles that are stable against decomposition or coagulation in acidic compositions having pH as disclosed herein, for example cationically-stabilized colloidal silica, acid stable pigments, such as titanium dioxide and carbon black and the like, provided that the additives do not interfere with the stability or functioning of the coating composition. Some embodiments of the invention do not have colloidal silica, or do not have anionically-stabilized silicas.

In one embodiment, a composition comprising fluorozirconic acid, a surfactant combination of an amine oxide surfactant and a nonionic surfactant produced zirconium oxide coated cold rolled steel (CRS) panels with salt spray performance after powder-painting that was at least as good as iron phosphate coatings on CRS and better than several commercially available zirconium oxide containing coatings on CRS. In some embodiments, high zirconium oxide coating weights, measured as milligrams zirconium per square meter, of 100-200 mg $Zr/m^2$ were routinely obtained from a 2-minute spray application on CRS panels.

Some surfactant combinations were found to lack stability at acidic pH typical for fluorozirconic acid solutions. However, surfactant combinations that increase the zirconium oxide containing coating deposition rate within the scope of the invention may be used with higher pH baths, provided that adequate stability is achieved.

This pretreatment can be used in three-stage pretreatment lines, pretreatment/rinse/rinse or pretreatment/pretreatment/rinse, as current iron phosphate (cleaner/pretreatment, water rinse, water rinse) or (cleaner/pretreatment, cleaner/pretreatment, water rinse) are used. A similar surfactant combination of cationic and/or amphoteric surfactant plus at least one non-ionic surfactant may be useful with fluorotitanic and other fluorometallic acids and/or salts.

Several formulas gave excellent corrosion performance on CRS (2-minute application, water rinses) with polyester powder paints (Rohm&Haas Corvel Cream polyester and yellow polyurethane). The corrosion performance was better than benchmark coatings deposited using a commercially available iron phosphate conversion cleaner/coater (containing other surfactants), iron phosphate with alkaline cleaning, without or with a polymer seal, as well as several fluorozirconic acid, and two commercially available zirconium dioxide depositing conversion coating compositions, all applied under similar bath conditions (e.g. similar hexafluorozirconic acid level, pH, free fluoride, time, temperature, etc.), but without surfactants added.

In a preferred embodiment, a stable concentrate comprising 10 g/l hexafluorozirconic acid, 61 g/l of an amine surfactant that was protonated at pH of less than 5.5, preferably less than 5 and 10 g/l of a nonionic surfactant was tested as a 3% dilution working bath for spray application pretreatment and provided improved coating weights.

Use conditions for compositions according to the invention are at temperatures, in increasing order of preference, of about 29, 32, 35, 38, 40, 43 or 49° C. (85, 90, 95, 100, 105, 110, 120° F.) and at most in increasing order of preference about 51, 54, 57, 60, 63, 65, 68 or 71° C. (125, 130, 135, 140, 145, 150, 155, 160° F.).

The metal surface to be coated with a zirconium oxide coating may be optionally cleaned with a conventional cleaner and then contacted with a composition according to the invention for a period of at least in increasing order of preference, 10, 15, 20, 25, 30, 45, 60, 75, 90 seconds, and not more than, at least for the sake of economy, in increasing order of preference 300, 250, 200, 150, 120 seconds, followed by rinsing. The full process can be seen in the examples below.

Concentrations given above are those for the working bath, unless otherwise stated. Concentrates for making the working bath may be provided at concentrations of 1× to 50× or more of the concentrations given for the working bath, provided that the increase in concentration does not cause precipitation or instability of the concentrate.

The surfactant combinations according to the invention are selected such that the resulting zirconium oxide depositing conversion coating baths are stable, that is at ambient or use temperatures, a bath does not precipitate, coagulate or split into layers such that it cannot be readily returned to a commercially acceptable coating performance with ordinary bath circulation mixing. Concentrate compositions are also provided; preferably the concentrate compositions are also storage stable as defined herein. The concentrates are storage stable if they do not precipitate or coagulate upon storage at ambient temperature for at least 30, 45, 60, 90, 120 days.

The compositions of the invention may be applied in a variety of treatment methods and steps for example: Uses of the compositions include uses as cleaner/coater compositions and as a zirconium oxide depositing conversion coating compositions. Contacting may be by immersion, spray, roll coater or other known application methods.

Benefits of the invention as compared to known iron phosphate coating products, including cleaner/coater combination products that clean a substrate and produce an iron phosphate conversion coating on ferrous surfaces in the same bath, include a phosphorus-free or low phosphate product that has less environmental concerns and does not require a polymer seal. The invention also can provide raw material cost savings and energy cost savings (e.g. lower temperature) as compared to traditional iron and zinc phosphate technologies. The invention also showed much improved corrosion performance over standard iron phosphate preceded by alkaline cleaning and followed by a deionized water rinse; over polymer sealed traditional iron phosphate; over cleaner/coater iron phosphate followed by a deionized water rinse; and over polymer sealed iron phosphate cleaner/coater. The invention further showed moderate improvements on corrosion performance over commercially available zirconium oxide depositing coating compositions on cold-rolled steel substrates. Suitable surfactant combinations include cationic and/or amphoteric surfactants with nonionic surfactants. These surfactant-modified fluorozirconic acid pretreatments are useful in for example, a three-stage cleaner coater process comprising a one-stage cleaner/coater application, and in a five stage application with either two cleaner/coater stages or with alkaline cleaning prior to application of the inventive composition, and in spray applications.

Benefits as compared to zirconium oxide depositing conversion coating products include a higher deposition rate per unit time which allows for faster production rates or thicker coatings having good adherence and corrosion resistance which had not been previously achieved, as well as in some embodiments, a unique coating morphology in the thick coatings.

EXAMPLES

Applicant initially screened approximately 100 surfactant combinations in dilute fluorozirconic acid for possible use as a composition that cleaned and coated with zirconium oxide in a single step. Initial tests included stability testing, foam testing, zirconium coating weight measurements, and salt spray corrosion testing. As a result of this extensive research, Applicants discovered that a combination of particular surfactants included in zirconium oxide depositing conversion coating baths surprisingly provided significant increases in coating weight for a standard contact time without reducing, and in some cases actually improving corrosion resistance.

Example 1

Coating Weight

Pretreatment Bath Preparation:

Procedure: Prepared concentrates containing 1 wt% $H_2ZrF_6$, as Component A, 2.5wt% Component B and 1wt% Component C, unless otherwise described in the Tables. Examined the concentrates for stability.

Prepared 20-liter baths containing 3 wt % of concentrate solutions. Adjusted the pH to 4.0-4.2 with ammonium bicarbonate and/or HF and the free fluoride levels with aluminum nitrate or ammonium bifluoride to a level of −98 to −102 RmV (10 to 50 ppm free fluoride). Baths as shown in Table 2 were made up according to the recited procedure, in the absence of any transition metal other than Zr.

Standard (6"×4") Cold Rolled Steel (CRS) test panels obtained from ACT Laboratories, Hillsdale, Mich. USA were processed according to the below process cycle. No precleaning was performed on the panels prior to stage 1. Three panels from each bath at each temperature were processed and the average of the coating weight for the three examples is provided in Table 2.

TABLE 1

Process Cycle:

| Stage | Chemical | Temp (° F.) | Time |
|---|---|---|---|
| 1 | 3% Coating bath containing Zr | 100 or 120 | 2 min |
| 2 | Tap Water Rinse | Ambient/Warm | 30 sec |
| 3 | DI Water Rinse | Ambient | 30 sec |
| 4 | Oven Dry | 250 | 7 min |

TABLE 2

Test Formulations, parameters and coating weights without precleaning step:

| Formula # | Component B | Component C | Zr Temp. ° F. | Zr Ct Wt. mg Zr/$m^2$ |
|---|---|---|---|---|
| 0 | None | None | 120 | 54 |
| 1 | Octyldimethylamine oxide Amphoteric - cationic in acid | Anionic Surfactant Mixture; Modified Ethoxylate, Acid Form | 120 | 1 |
| 2 | Octyldimethylamine oxide Amphoteric - cationic in acid | none | 120 | 49 |
| 3 | None | Nonionic EO/PO Block copolymer | 120 | 137 bath precipitated |
| 4 | Anionic Surfactant Mixture; Modified Ethoxylate, Acid Form; | Octyldimethylamine oxide Amphoteric - cationic in acid | 120 | 1 |
| 5 | Anionic Surfactant Mixture; Modified Ethoxylate, Acid Form; | Nonionic EO/PO Block copolymer | 120 | 1 |
| 6 | Anionic (in alkaline pH) phosphate polyether ester surfactant nonionic at low pH | Nonionic EO/PO Block copolymer | 120 | 4 |
| 7 | Octyl phenol with 9-10 moles Ethoxylation | Nonionic EO/PO Block copolymer | 120 | 121 |
| 8 | Coco Alkyl, Ethoxylated Amine Nonionic - becomes cationic in acid | Nonionic EO/PO Block copolymer | 100 | 93 |
|  | Coco Alkyl, Ethoxylated Amine Nonionic - becomes cationic in acid | Nonionic EO/PO Block copolymer | 120 | 95 |
| 9 | Octyldimethylamine oxide - cationic in acid | Nonionic Alkoxylated Linear alcohol | 100 | 137 |
|  | Octyldimethylamine oxide - cationic in acid | Nonionic Alkoxylated Linear alcohol | 120 | 208 |
| 10 | Octyldimethylamine oxide - cationic in acid | Nonionic n-Butyl Alkyl polyglycol ether $C_{12-18}$ | 100 | 127 |
|  | Octyldimethylamine oxide - cationic in acid | Nonionic n-Butyl Alkyl polyglycol ether $C_{12-18}$ | 120 | 171 |
| 11 | Octyldimethylamine oxide - cationic in acid | Nonionic Benzyl alcohol ethoxylate with 4 moles EO | 100 | 100 |
|  | Octyldimethylamine oxide - cationic in acid | Nonionic Benzyl alcohol ethoxylate with 4 moles EO | 120 | 118 |

TABLE 2-continued

Test Formulations, parameters and coating weights without precleaning step:

| Formula # | Component B | Component C | Zr Temp. °F. | Zr Ct Wt. mg Zr/m$^2$ |
|---|---|---|---|---|
| 12 | Octyldimethylamine oxide - cationic in acid | Nonionic C11 Alcohol + 3 EO | 100 | 81 |
|  | Octyldimethylamine oxide - cationic in acid | Nonionic C11 Alcohol + 3 EO | 120 | 206 |
| 13 | Octyldimethylamine oxide - cationic in acid | Nonionic EO/PO Block copolymer | 100 | 102 |
|  | Octyldimethylamine oxide - cationic in acid | Nonionic EO/PO Block copolymer | 120 | 173 |
| 14 | Octyldimethylamine oxide - cationic in acid | Nonionic Alkoxylated terpene | 100 | 135 |
|  | Octyldimethylamine oxide - cationic in acid | Nonionic Alkoxylated terpene | 120 | 171 |
| 15 | Octyldimethylamine oxide - cationic in acid | Nonionic Alkyl C8-10 alkoxylated benzene ether | 100 | 144 |
|  | Octyldimethylamine oxide - cationic in acid | Nonionic Alkyl C8-10 alkoxylated benzene ether | 120 | 195 |
| 16 | Alkyl ether hydroxypropyl sultaine | Nonionic EO/PO Block copolymer | 100 | 78 |
|  | Alkyl ether hydroxypropyl sultaine | Nonionic EO/PO Block copolymer | 120 | 135 |
| 17 | Alkyl ether hydroxypropyl sultaine | Nonionic Alkoxylated terpene | 100 | 60 |
|  | Alkyl ether hydroxypropyl sultaine | Nonionic Alkoxylated terpene | 120 | 90 |
| 18 | Amine C$_{12-14}$ t-alkyl, EO/PO Cationic in acid | Nonionic n-Butyl Alkyl polyglycol ether C$_{12-18}$ | 100 | 103 |
|  | Amine C$_{12-14}$ t-alkyl, EO/PO Cationic in acid | Nonionic n-Butyl Alkyl polyglycol ether C$_{12-18}$ | 120 | 105 |
| 19 | Amine C$_{12-14}$ t-alkyl, EO/PO Cationic in acid | Nonionic EO/PO Block copolymer | 100 | 121 |
|  | Amine C$_{12-14}$ t-alkyl, EO/PO Cationic in acid | Nonionic EO/PO Block copolymer | 120 | 129 |
| 20 | Amine C$_{12-14}$ t-alkyl, EO/PO Cationic in acid | Nonionic Alkoxylated terpene | 100 | 118 |
|  | Amine C$_{12-14}$ t-alkyl, EO/PO Cationic in acid | Nonionic Alkoxylated terpene | 120 | 126 |
| 21 | Sodium Capryloamphoproprionate | Nonionic EO/PO Block copolymer | 120 | 17 |
| 22 | Oleyl Hydroxyethylimidazoline | Nonionic EO/PO Block copolymer | 120 | 6 |

In Table 2: Formulas 0-6, 21 and 22 are Comparative Examples. Formula 3 did not contain 1% Component C because it remained insoluble. Formulas 21 and 22 had unsaturated, non aromatic ring structures and both gave low coating weights.

The above zirconium based cleaner coater metal pretreatment compositions show that nitrogen containing surfactants, in particular amine and amine oxide surfactants, in combination with nonionic surfactants enhance Zr oxide coating deposition on CRS while other surfactants inhibit Zr oxide deposition compared to H$_2$ZrF$_6$ alone and to commercially available Zr metal pretreatments shown in Table 3, below.

TABLE 3

Commercially available Zirconium Oxide depositing Metal Pretreatments

| Benchmark Zr containing metal pretreatments | | Surfactant | Cleaner | Zr bath Temp °F. | Zr Ct Wt. mg Zr/m$^2$ | ASTM B-117 (2008) 800 hrs$^2$ |
|---|---|---|---|---|---|---|
| Comparative Example 1 | H$_2$ZrF$_6$ | None | | 100° F. 2 min | 120 | 99 | 5.4 |
| Comparative Example 2 | Comparative Example 2a | None | | 100° F. 2 min | 74 | 41 | 3.8 |
|  | Comparative Example 2b | None | | 100° F. 2 min | 100 | 87 | 4.1 |
|  | Comparative Example 2c | None | | 100° F. 2 min | 120 | 89 | 4.1 |
| Comparative Example 3 | Comparative Example 3a | None | | 100° F. 2 min | 74 | 139 | 11.0 |

TABLE 3-continued

Commercially available Zirconium Oxide depositing Metal Pretreatments

| Benchmark Zr containing metal pretreatments | Surfactant | Cleaner | Zr bath Temp °F. | Zr Ct Wt. mg Zr/m$^2$ | ASTM B-117 (2008) 800 hrs$^2$ |
|---|---|---|---|---|---|
| Comparative Example 3b | None | | 100° F. 2 min | 207 | 4.5 |
| Comparative Example 3c | None | | 100° F. 2 min | 208 | 3.8 |

Comparative Example 1 contained $H_2ZrF_6$ in water.
Comparative Example 2 was a commercially available zirconium oxide depositing metal pretreatment based on $H_2ZrF_6$, without additives to increase Zr deposition rate.
Comparative Example 3 was a commercially available zirconium oxide depositing metal pretreatment based on $H_2ZrF_6$, with a transition metal additive (Cu) to increase Zr deposition rate.
Coating weights for the invention were higher than commercially available zirconium coating products and in several cases comparable to commercial products that had transition metal additives to increase coating weight.

Laboratory test results showed that addition of a surfactant combination according to the invention increased coating deposition rate as compared to surfactant free conversion coating baths as well as comparative surfactant combinations. That is, not all surfactants provide the same benefit of increased deposition rate of zirconium oxide coating on metal substrates than similar coating bath compositions in the absence of the surfactant combination and/or thicker zirconia based coatings having good adherence. High zirconium coating weights for compositions according to the invention show that zirconium compounds are being deposited on the metal surface and are not rinsed off. In the comparative examples, using commercially available zirconium oxide depositing conversion coating baths containing anionically stabilized silica, zirconium coating weights were lower in the absence of a separate transition metal deposition enhancer. The compositions of the invention provided thickness that compared favorably to the enhanced commercial product, and did so without a precleaning step.

Example 2

Coating Weight without Cleaning Comparison

Another set of panels was prepared according to Example 1 for Comparative Example 1', where the zirconium oxide depositing pretreatment bath was maintained at a lower temperature of 100 OF. Table 4 shows the performance of cleaner/coater compositions of Formula 13, applied in the absence of alkaline cleaning, as compared to surfactant free compositions of Formula 0, without cleaning, and the Comparative Examples, which were cleaned, using Ridoline RT180, an alkaline cleaner commercially available from Henkel Corporation, prior to deposition of zirconium oxide.

TABLE 4

Surfactant containing baths coat without pre-cleaning

| | Component B | Component C | Ridoline RTI80 100° F., 2 min | Zr Temp. °F. | Zr Ct Wt. mg Zr/m$^2$ |
|---|---|---|---|---|---|
| Formula 0 | None | None | NA | 120 | 54 |
| Formula 13 | Octyldimethylamine oxide - cationic in acid | Nonionic EO/PO Block copolymer | NA | 100 | 95 |
| Formula 13 | Octyldimethylamine oxide - cationic in acid | Nonionic EO/PO Block copolymer | NA | 120 | 162 |
| Formula 13 | Octyldimethylamine oxide - cationic in acid | Nonionic EO/PO Block copolymer | NA | 100 | 109 |
| Formula 13 | Octyldimethylamine oxide - cationic in acid | Nonionic EO/PO Block copolymer | NA | 120 | 184 |
| Comparative Example 1' | None | None | 100° F., 2 min | 100 | 55 |
| Comparative Example 1 | None | None | 100° F., 2 min | 120 | 99 |
| Formula 13 | Octyldimethylamine oxide - cationic in acid | Nonionic EO/PO Block copolymer | 100° F., 2 min | 120 | 68 |
| Comparative Example 2a | None | None | 100° F., 2 min | 74 | 41 |
| Comparative Example 2b | None | None | 100° F., 2 min | 100 | 87 |
| Comparative Example 2c | None | None | 100° F., 2 min | 120 | 89 |
| Comparative Example 3a | None | None | 100° F., 2 min | 74 | 139 |
| Comparative Example 3b | None | None | 100° F., 2 min | 100 | 207 |
| Comparative Example 3c | None | None | 100° F., 2 min | 120 | 208 |

The foregoing comparative testing showed that zirconium based cleaner coater metal pretreatment compositions comprising nitrogen-containing surfactants, in particular amine and amine oxide surfactants, in combination with nonionic surfactants enhance Zr oxide deposition in the absence of alkaline cleaning.

Example 2

Coating Weight without Cleaning Comparison

Another set of panels was prepared according to the procedure of Example 1, modified as described in Table 5, below. A comparative cleaner/coater that deposits iron phosphate on cold rolled steel without prior cleaning was used to treat panels as described in Table 5. All panels were allowed to dry and then, for each pretreatment formulation, two panels were painted, each with a different commercially available powder paint according to the manufacturers' instructions. Thereafter the panels were subjected to salt spray testing according to ASTM B-117 (2008) an industry standard corrosion test. ASTM B-117 measures corrosion, thus a lower test result number indicates better performance. Table 5 shows the performance of various cleaner/coater compositions of the invention, applied in the absence of alkaline cleaning, as compared to the iron phosphate cleaner coater with and without pre-cleaning and surfactant-free zirconium oxide depositing compositions with cleaning, using RIDOLINE® RT180, an alkaline cleaner commercially available from Henkel Corporation, prior to deposition of zirconium oxide. Certain surfactant combinations (cationic or amphoteric surfactants with nonionic surfactants) not only gave stable concentrates, but surprisingly significantly increased zirconium deposition and in several cases gave much improved corrosion performance when compared to standard iron phosphates with polymer seals and commercially available zirconium-based conversion coatings on CRS.

TABLE 5

| | | ASTM B-117 (2008) Salt Spray with two Different Paints | | | | |
|---|---|---|---|---|---|---|
| | | Ridoline RT | Zr MPT | Zr Ct Wt. | ASTM B-117 | |
| COMPONENT B | COMPONENT C | 180 100° F., 2 min | Temp ° F. | (mg/m$^2$) | 500 hrs[1] | 800 hrs[2] |
| Alkyl ether hydroxypropyl sultaine | Nonionic EO/PO Block copolymer | No | 100 | 78 | 2.7 | 10.8 |
| Alkyl ether hydroxypropyl sultaine | Nonionic EO/PO Block copolymer | No | 120 | 135 | 2.7 | 4.3 |
| Amine C$_{12-14}$ t-alkyl, EO/PO Cationic in acid | Nonionic EO/PO Block copolymer | No | 100 | 121 | 3.6 | 6.0 |
| Amine C$_{12-14}$ t-alkyl, EO/PO Cationic in acid | Nonionic EO/PO Block copolymer | No | 120 | 129 | 2.4 | 6.2 |
| Coco Alkyl, Ethoxylated Amine Nonionic - cationic in acid | Nonionic EO/PO Block copolymer | No | 100 | 93 | 2.3 | 3.6 |
| Coco Alkyl, Ethoxylated Amine Nonionic - cationic in acid | Nonionic EO/PO Block copolymer | No | 120 | 95 | 3.0 | 3.5 |
| Alkyl ether hydroxypropyl sultaine | Nonionic Alkoxylated terpene | No | 100 | 60 | 2.7 | 6.1 |
| Alkyl ether hydroxypropyl sultaine | Nonionic Alkoxylated terpene | No | 120 | 90 | 2.5 | 4.2 |
| Amine C$_{12-14}$ t-alkyl, EO/PO Cationic in acid | Nonionic Alkoxylated terpene | No | 100 | 118 | 2.9 | 4.1 |
| Amine C$_{12-14}$ t-alkyl, EO/PO Cationic in acid | Nonionic Alkoxylated terpene | No | 120 | 126 | 3.5 | 5.1 |
| Amine C$_{12-14}$ t-alkyl, EO/PO Cationic in acid | Nonionic n-Butyl Alkyl polyglycol ether C$_{12-18}$ | No | 100 | 103 | 3.1 | 3.4 |
| Amine C$_{12-14}$ t-alkyl, EO/PO Cationic in acid | Nonionic n-Butyl Alkyl polyglycol ether C$_{12-18}$ | No | 120 | 105 | 3.0 | 1.3 |
| Octyldimethylamine oxide Amphoteric - cationic in acid | Nonionic EO/PO Block copolymer | No | 100 | 109 | 2.1 | 4.9 |
| Octyldimethylamine oxide - cationic in acid | Nonionic EO/PO Block copolymer | No | 120 | 184 | 1.2 | 2.0 |
| Octyldimethylamine oxide - cationic in acid | Nonionic Alkoxylated Linear alcohol | No | 100 | 137 | 3.4 | 2.9 |
| Octyldimethylamine oxide - cationic in acid | Nonionic Alkoxylated Linear alcohol | No | 120 | 208 | 1.2 | 3.2 |
| Octyldimethylamine oxide - cationic in acid | Nonionic n-Butyl Alkyl polyglycol ether C$_{12-18}$ | No | 100 | 127 | 1.8 | 2.9 |
| Octyldimethylamine oxide - cationic in acid | Nonionic n-Butyl Alkyl polyglycol ether C$_{12-18}$ | No | 120 | 171 | 1.6 | 2.6 |
| Octyldimethylamine oxide - cationic in acid | Nonionic Alkoxylated terpene | No | 100 | 135 | 1.7 | 2.7 |
| Octyldimethylamine oxide - cationic in acid | Nonionic Alkoxylated terpene | No | 120 | 171 | 1.7 | 9.2 |
| Octyldimethylamine oxide - cationic in acid | Nonionic C11 Alcohol + 3 EO | No | 100 | 81 | 5.9 | 2.3 |
| Octyldimethylamine oxide - cationic in acid | Nonionic C11 Alcohol + 3 EO | No | 120 | 206 | 1.9 | 3.3 |
| Octyldimethylamine oxide - cationic in acid | Nonionic C11 Alcohol + 3 EO | No | 100 | 100 | 2.9 | 4.7 |
| Octyldimethylamine oxide - cationic in acid | Nonionic C11 Alcohol + 3 EO | No | 120 | 118 | 3.4 | 4.6 |
| Octyldimethylamine oxide - cationic in acid | Nonionic Alkyl C$_{8-10}$ alkoxylated benzene ether | No | 100 | 144 | 2.2 | 3.1 |

TABLE 5-continued

ASTM B-117 (2008) Salt Spray with two Different Paints

| | | | | | | |
|---|---|---|---|---|---|---|
| Octyldimethylamine oxide - cationic in acid | Nonionic Alkyl $C_{8-10}$ alkoxylated benzene ether | No | 120 | 195 | 1.9 | NA |
| Octyldimethylamine oxide - cationic in acid | Anionic Surfactant Mixture; Modified Ethoxylate, Acid Form | No | 120 | 1 | NA | 3.8 |
| None | None | Yes | 100 | 55 | 3.0 | 4.7 |
| None | None | Yes | 120 | 99 | 2.8 | 7.4 |

| Pretreatment | Post Treatment | Alkaline Cleaning | MPT Temp ° F. | Coating Wt. | ASTM B-117 500 hrs | 800 hrs |
|---|---|---|---|---|---|---|
| Comp. Example 2 | None | Yes | 74 | 41 mg $Zr/m^2$ | 3.1 | 5.4 |
| Bonderite 1000 (Fe phosphate) | DI Water | Yes | 150 | 54 mg/ft² | 4.6 | 4.2 |
| Bonderite 1000 (Fe phosphate) | Parcolene ® 99x | Yes | 150 | 45 mg/ft2 | 2.8 | 3.9 |
| Bonderite 1000 (Fe phosphate)) | DI Water | No | 130 | 48 mg/ft2 | 12.5 | 8.7 |
| Bonderite 1000 (Fe phosphate) | Parcolene ® 99x | No | 130 | 51 mg/ft2 | 2.8 | 3.9 |
| Clean Only | None | Yes | NA | NA | 4.3 | 11.1 |

[1]Commercially available cream colored polyester powder paint supplied by Rohm and Haas
[2]Commercially available yellow polyurethane powder paint supplied by Rohm and Haas The foregoing comparative testing showed that zirconium based cleaner coater metal pretreatment compositions containing amine and amine oxide surfactants in combination with nonionic surfactants provide corrosion performance equal to or greater than commercially available Zr oxide depositing metal pretreatments and coatings.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method for increasing deposition rate of a zirconium oxide depositing conversion coating bath on metal surfaces, comprising the steps of:
   1) providing a metal substrate having metal surfaces selected from ferrous metal, zinc, zinc alloy, aluminum, aluminum alloy and combinations thereof;
   2) contacting said metal surfaces with the zirconium oxide depositing conversion coating bath having a pH range of 1 to 6.0 and comprising:
      a. a zirconium-based metal pretreatment coating composition comprising 50 to 1000 ppm of dissolved Zr, dissolved Cu present in an amount of up to 50 ppm, 0 to 100 ppm of $SiO_2$, 50 to 2000 ppm of total fluoride, 10 to 120 ppm of free fluoride; and
      b. a surfactant combination comprising:
         a source of a first surfactant that is cationic at the pH range of the zirconium oxide depositing conversion coating bath, wherein the first surfactant is selected from a) surfactants having an amine moiety, b) surfactants having an amine oxide moiety or c) combinations of a) and b);
         a source of at least one non-ionic, saturated, acyclic surfactant; different from the first surfactant; and
      c. optionally a chelating agent and/or other additives
   wherein the surfactant combination is selected such that the at least one-non-ionic surfactant is uniformly dispersed or stabilized in the presence of the first surfactant, in the zirconium-based metal pretreatment coating composition;
   wherein step 2) follows step 1) without an intermediate cleaning step such that the zirconium oxide depositing conversion coating bath provides cleaning and coating in a single bath, for a time ranging from 10 to 300 seconds thereby depositing an adherent zirconium oxide containing pretreatment coating having a selected thickness on the metal substrate in the absence of prior cleaning; and
   3) optionally applying a paint to the metal pretreatment coated metal substrate;
   wherein the time of step 2) is less than a time required to form another zirconium oxide containing pretreatment coating having the selected thickness on the metal substrate by contact with a.) in the absence of: b) and, if present, c).

2. The method according to claim 1 wherein the zirconium oxide depositing conversion coating bath has 0 ppm of $SiO2$ and step 2) is followed by a rinsing step prior to step 3).

3. The method according to claim 1 wherein the metal surfaces are multi-metal substrates comprising steel metal surfaces and one or more of zinc, zinc alloy, aluminum and aluminum alloy.

4. The method according to claim 3 wherein the selected thickness of the zirconium oxide containing pretreatment coating deposited on the steel metal surfaces of the multi-metal substrate is in a range of 100 to 250 mg/m² add-on weight measured as zirconium wherein the contact time ranges from 75 to 120 seconds.

5. The method according to claim 1 wherein the zirconium oxide depositing conversion coating bath is phosphate-free and has a pH in a range from 1.0 to 5; and the contacting step is for a period of at least 10 seconds and not more than 300 seconds followed by rinsing.

6. The method according to claim 1 wherein the first surfactant is present in an amount of about 500 ppm to about 1000 ppm and the at least one non-ionic surfactant, different from the first surfactant, is present in an amount of about 150 ppm to about 600 ppm.

7. The method according to claim 1 wherein the selected pH range is acidic and 25 wt % up to 100 wt % of the first surfactant is protonated.

8. The method according to claim 1 wherein the source of the first surfactant comprises at least one first surfactant according to general formula I below:

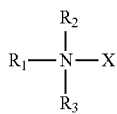

where $R_1$ is saturated or unsaturated, branched or unbranched, cyclic or acyclic, alkyl, hydroxyalkyl, ether or hydroxyether moiety having 1 to 20 carbon atoms; $R_2$ and $R_3$ independently can be H, alkyl or aryl moieties and X can be O, H, alkyl or aryl moiety.

9. The method according to claim 8 wherein X is O.

10. The method according to claim 8 wherein the at least one first surfactant is selected from alkoxylated alkyl amines having branched or unbranched, cyclic or acyclic alkyl groups of 1 to 20 carbon atoms; alkyl amine oxides; and sultaines.

11. The method according to claim 1 wherein the source of at least one non-ionic surfactant; different from the first surfactant comprises at least one non-ionic surfactant selected from $C_{6-20}$ alkyl polyglycol ethers, fatty amine ethoxylates; ethoxylated $C_{6-20}$ alcohols; and EO/PO block copolymers.

12. The method according to claim 1, wherein after step 2), step 3) is present and comprises applying the paint, comprising an initial layer by electrodeposition with baking, to the metal pretreatment coated metal substrate.

13. The method according to claim 6, wherein the source of the at least one non-ionic surfactant, different from the first surfactant, comprises at least one non-ionic surfactant selected from $C_{6-20}$ alkyl polyglycol ethers, fatty amine ethoxylates; ethoxylated $C_{6-20}$ alcohols; and EO/PO block copolymers.

14. The method according to claim 13 wherein the surfactants having the amine moiety are selected from the group consisting of alkoxylated alkyl amines, having branched or unbranched, cyclic or acyclic alkyl groups of 1 to 20 carbon atoms; and sultaines.

15. The method according to claim 14 wherein the alkoxylated alkyl amines, having branched or unbranched, cyclic or acyclic alkyl groups of 1 to 20 carbon atoms of a) are selected from ethoxylated coco alkyl amines having 5-20 moles of ethoxylation and polyoxyethylene polyoxypropylene tert-$C_{12-14}$-alkyl amines.

16. The method according to claim 14 wherein the sultaines of a) are selected from the group consisting of hydroxypropyl alkylether sultaines, lauramidopropyl hydroxysultaine, cocamidopropyl hydroxysultaine, oleamidopropyl hydroxysultaine, tallowamidopropyl hydroxysultaine, erucamidopropyl hydroxysultaine, and lauryl hydroxysultaine.

17. The method according to claim 13 wherein the surfactants having the amine oxide moiety are alkyl amine oxides.

18. The method according to claim 17 wherein the alkyl amine oxides are selected from the group consisting of dodecyl dimethyl amine oxide, dodecyl methyl amine oxide, dodecyl amine oxide, decyl dimethyl amine oxide, decyl methyl amine oxide, decyl amine oxide, octyl dimethyl amine oxide, octyl methyl amine oxide, octyl amine oxide, and heptyl dimethyl amine oxide.

19. The method according to claim 18 wherein the alkyl amine oxides are octyl dimethyl amine oxide.

20. The method according to claim 3 wherein step 3) is present and comprises applying the paint and subsequent to paint application step 3) the steel metal surfaces of the multi-metal substrates show a scribe creep of 1.3 to 3.6 after 800 hours of ASTM B-117 (2008) Salt Spray testing.

21. The method according to claim 1 further comprising rinsing the zirconium oxide containing pretreatment coating with water after step 2).

22. The method according to claim 21 wherein step 2) is performed twice before step 3).

23. The method according to claim 9 wherein $R_1$ is saturated or unsaturated, branched or unbranched, alkyl moiety having 7 to 12 carbon atoms; $R_2$ and $R_3$ independently can be H or alkyl moieties.

24. The method according to claim 1, wherein:
the metal surfaces present include ferrous metal surfaces;
the first surfactant is selected from the group consisting of ethoxylated coco alkyl amines having 5-20 moles of ethoxylation, octyldimethylamine oxide, hydroxypropyl alkylether sultaine, polyoxyethylene polyoxypropylene tert-$C_{12-14}$-alkyl amine and combinations thereof;
the at least one non-ionic surfactant, different from the first surfactant, is selected from a polyoxyethylene polyoxypropylene block copolymer, an alkoxylated linear alcohol, an n-butyl alkyl polyglycol ether $C_{12-18}$, a $C_{11}$ alcohol with 3 moles of ethoxylation, and an alkoxylated terpene; and
the contact time ranges from 75 to 120 seconds.

25. The method according to claim 24 wherein subsequent to paint application step 3) the ferrous metal surfaces show a scribe creep of 1.3 to 3.6 after 800 hours of ASTM B-117 (2008) Salt Spray testing.

26. A method for increasing deposition rate of a zirconium oxide depositing conversion coating bath on metal surfaces, comprising the steps of:
1) providing a metal substrate having metal surfaces selected from ferrous metal, zinc, zinc alloy, aluminum, aluminum alloy and combinations thereof;
2) contacting said metal surfaces with the zirconium oxide depositing conversion coating bath having a pH range of 1 to 6.0 and comprising:
 a. a zirconium-based metal pretreatment coating composition comprising 50 to 1000 ppm of dissolved Zr, dissolved Cu present in an amount of up to 50 ppm, 0 to 100 ppm of $SiO_2$, 50 to 2000 ppm of total fluoride, 10 to 120 ppm of free fluoride; and
 b. a surfactant combination comprising:
  a source of a first surfactant that is cationic at the pH range of the zirconium oxide depositing conversion coating bath;
  a source of at least one non-ionic surfactant; different from the first surfactant; and
 c. optionally a chelating agent and/or other additives
 wherein the surfactant combination is selected such that the at least one-non-ionic surfactant is uniformly dispersed or stabilized in the presence of the first surfactant, in the zirconium-based metal pretreatment coating composition;
wherein step 2) follows step 1) without an intermediate cleaning step such that the zirconium oxide depositing conversion coating bath provides cleaning and coating in a single bath, for a time ranging from 10 to 300 seconds thereby depositing an adherent zirconium oxide containing pretreatment coating having a selected thickness on the metal substrate in the absence of prior cleaning; and
3) optionally applying a paint to the metal pretreatment coated metal substrate;
wherein the time of step 2) is less than a time required to form another zirconium oxide containing pretreatment coating having the selected thickness on the metal substrate by contact with a.) in the absence of: b) and, if present, c);
wherein the first surfactant is selected from a) surfactants having an amine moiety, b) surfactants having an amine oxide moiety or c) combinations of a) and b); and
wherein the source of the at least one non-ionic surfactant, different from the first surfactant, comprises at least one non-ionic surfactant selected from $C_{6-20}$ alkyl polyglycol ethers, fatty amine ethoxylates; alkyl $C_{6-20}$ alkoxylated benzene-based ethers; ethoxylated $C_{6-20}$ alcohols; EO/PO block copolymers; and alkoxylated terpenes; wherein the $C_{6-20}$ alkyl polyglycol ether is a n-butyl $C_{12-18}$ alkyl polyglycol ether; and the ethoxylated $C_{6-20}$ alcohol is a $C_{11}$ alcohol with 3 moles of ethoxylation.

27. A method for increasing deposition rate of a zirconium oxide depositing conversion coating bath, comprising the steps of:
1) providing a metal substrate having metal surfaces selected from ferrous metal, zinc, zinc alloy, aluminum, aluminum alloy and combinations thereof;
2) contacting said metal surfaces with the zirconium oxide depositing conversion coating bath having a pH range of 1 to 6.0 and comprising:
   a. a zirconium-based metal pretreatment coating composition comprising 50 to 1000 ppm of dissolved Zr, dissolved Cu present in an amount of up to 50 ppm, 0 to 100 ppm of $SiO_2$, 50 to 2000 ppm of total fluoride, 10 to 120 ppm of free fluoride; and
   b. a surfactant combination comprising:
      a source of a first surfactant that is cationic at the pH range of the zirconium oxide depositing conversion coating bath, wherein the first surfactant is selected from a) surfactants having an amine moiety, b) surfactants having an amine oxide moiety or c) combinations of a) and b);
      a source of at least one non-ionic surfactant different from the first surfactant and uniformly dispersed in the presence of the first surfactant in the zirconium-based metal pretreatment coating composition; and
   c. a chelating agent;
   said contacting step being for a time ranging from 10 to 300 seconds thereby depositing an adherent zirconium oxide containing pretreatment coating having a selected thickness on the metal substrate; and
3) applying a paint to the metal pretreatment coated metal substrate;
wherein the time of step 2) is less than a time required to form another zirconium oxide containing pretreatment coating having the selected thickness on the metal substrate by contact with a.) in the absence of: b) and c).

28. The method according to claim 27, wherein:
the metal surfaces present include ferrous metal surfaces;
the first surfactant is selected from the group consisting of ethoxylated coco alkyl amines having 5-20 moles of ethoxylation, octyldimethylamine oxide, hydroxypropyl alkylether sultaine, polyoxyethylene polyoxypropylene tert-$C_{12-14}$-alkyl amine and combinations thereof;
the at least one non-ionic surfactant, different from the first surfactant, is selected from a polyoxyethylene polyoxypropylene block copolymer, an alkoxylated linear alcohol, an n-butyl alkyl polyglycol ether $C_{12-18}$, a $C_{11}$ alcohol with 3 moles of ethoxylation, and an alkoxylated terpene; and p1 the contact time ranges from 75 to 120 seconds.

29. The method according to claim 28 wherein subsequent to paint application step 3) the ferrous metal surfaces show a scribe creep of 1.3 to 3.6 after 800 hours of ASTM B-117 (2008) Salt Spray testing.

30. A method for increasing deposition rate of a zirconium oxide depositing conversion coating bath on metal surfaces, comprising the steps of:
1) providing a metal substrate having metal surfaces selected from ferrous metal, zinc, zinc alloy, aluminum, aluminum alloy and combinations thereof;
2) contacting said metal surfaces with the zirconium oxide depositing conversion coating bath having a pH range of 1 to 6.0 and comprising:
   a. a zirconium-based metal pretreatment coating composition comprising 50 to 1000 ppm of dissolved Zr, 0 to 50 ppm dissolved Cu, 0 to 100 ppm of $SiO_2$, 50 to 2000 ppm of total fluoride, 10 to 120 ppm of free fluoride; and
   b. a surfactant combination comprising:
      a source of a first surfactant that is cationic at the pH range of the zirconium oxide depositing conversion coating bath, wherein the first surfactant is present in an amount of about 50 ppm to about 900 ppm and selected from a) surfactants having an amine moiety, b) surfactants having an amine oxide moiety or c) combinations of a) and b);
      a source of at least one non-ionic surfactant selected from the group consisting of $C_{6-20}$ alkyl polyglycol ethers, fatty amine ethoxylates; ethoxylated $C_{6-20}$ alcohols; EO/PO block copolymers; and alkoxylated terpenes; different from the first surfactant; said non-ionic surfactant being present in an amount of about 25 ppm to about 500 ppm; and
   c. optionally a chelating agent and/or other additives
   wherein the surfactant combination is selected such that the first surfactant couples the at least one-non-ionic surfactant into the aqueous composition thereby uniformly dispersing or stabilizing said non-ionic surfactant in the zirconium-based metal pretreatment coating composition;
said contacting step being for a time ranging from 10 to 300 seconds thereby depositing an adherent zirconium oxide containing pretreatment coating having a selected thickness on the metal substrate; and
3) applying a paint to the metal pretreatment coated metal substrate;
wherein the time of step 2) ranges from 10 to 300 seconds and is less than a time required to form another zirconium oxide containing pretreatment coating having the selected thickness on the metal substrate by contact with a.) in the absence of: b) and, if present, c).

31. The method according to claim 30, wherein:
the metal surfaces present include ferrous metal surfaces;
the first surfactant is selected from the group consisting of ethoxylated coco alkyl amines having 5-20 moles of ethoxylation, octyldimethylamine oxide, hydroxypropyl alkylether sultaine, polyoxyethylene polyoxypropylene tert-$C_{12-14}$-alkyl amine and combinations thereof;

the at least one non-ionic surfactant, different from the first surfactant, is selected from a polyoxyethylene polyoxypropylene block copolymer, an alkoxylated linear alcohol, an n-butyl alkyl polyglycol ether $C_{12-18}$, a $C_{11}$ alcohol with 3 moles of ethoxylation, and an alkoxylated terpene; and the contact time ranges from 75 to 120 seconds.

32. The method according to claim 31 wherein subsequent to paint application step 3) the ferrous metal surfaces show a scribe creep of 1.3 to 3.6 after 800 hours of ASTM B-117 (2008) Salt Spray testing.

\* \* \* \* \*

UNITED STATES PATENT AND TRADEMARK OFFICE
CERTIFICATE OF CORRECTION

PATENT NO. : 10,385,219 B2
APPLICATION NO. : 14/127524
DATED : August 20, 2019
INVENTOR(S) : Elizabeth J. Siebert and Bruce H. Goodreau Page 1 of 1

It is certified that error appears in the above-identified patent and that said Letters Patent is hereby corrected as shown below:

In the Specification

Column 1, Line 33: Change "coining" to --coming--.

In the Claims

Column 21, Line 31: Change "$C_{6-0}$alcohols;" to --$C_{6-20}$ alcohols;--.

Signed and Sealed this
Twenty-fourth Day of March, 2020

Andrei Iancu
*Director of the United States Patent and Trademark Office*